US012552186B2

(12) United States Patent
Goto et al.

(10) Patent No.: US 12,552,186 B2
(45) Date of Patent: Feb. 17, 2026

(54) BIASING FORCE ADJUSTING DEVICE, TRANSFER DEVICE, AND IMAGE FORMING APPARATUS

(71) Applicants: Yutaka Goto, Kanagawa (JP); Seiichi Kogure, Kanagawa (JP); Hiroshi Kikuchi, Kanagawa (JP); Hideki Kimura, Kanagawa (JP); Yutaka Takahashi, Kanagawa (JP); Kazuhiro Shimada, Kanagawa (JP); Yusuke Ishizuka, Kanagawa (JP); Takuya Akiyama, Kanagawa (JP); Yuuki Aoki, Tokyo (JP)

(72) Inventors: Yutaka Goto, Kanagawa (JP); Seiichi Kogure, Kanagawa (JP); Hiroshi Kikuchi, Kanagawa (JP); Hideki Kimura, Kanagawa (JP); Yutaka Takahashi, Kanagawa (JP); Kazuhiro Shimada, Kanagawa (JP); Yusuke Ishizuka, Kanagawa (JP); Takuya Akiyama, Kanagawa (JP); Yuuki Aoki, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 300 days.

(21) Appl. No.: 17/885,557

(22) Filed: Aug. 11, 2022

(65) Prior Publication Data

US 2023/0061068 A1 Mar. 2, 2023

(30) Foreign Application Priority Data

Aug. 31, 2021 (JP) ................................ 2021-140590

(51) Int. Cl.
*B65H 5/06* (2006.01)
*B41J 25/312* (2006.01)
*G03G 15/00* (2006.01)

(52) U.S. Cl.
CPC ............ *B41J 25/312* (2013.01); *B65H 5/062* (2013.01); *B65H 2405/1117* (2013.01)

(58) Field of Classification Search
CPC ........... G03G 15/1615; G03G 15/1675; G03G 15/0136; G03G 15/1605; G03G 15/1685; B65H 5/062; B65H 2405/1117
See application file for complete search history.

(56) References Cited

U.S. PATENT DOCUMENTS

2003/0063921 A1* 4/2003 Saito ................. G03G 15/1615 399/121
2007/0286628 A1* 12/2007 Kayahara ........... G03G 15/1605 399/66

(Continued)

FOREIGN PATENT DOCUMENTS

JP 2011-209663 A 10/2011
JP 2014-194515 A 10/2014
JP 2015-060030 3/2015

OTHER PUBLICATIONS

Office Action issued Jun. 3, 2025 in Japanese Patent Application No. 2021-140590, 5 pages.

*Primary Examiner* — Luis A Gonzalez
(74) *Attorney, Agent, or Firm* — XSENSUS LLP

(57) ABSTRACT

A biasing force adjusting device includes a roller, a roller holder, a first biasing member, and a second biasing member. The roller faces a mover. The roller holder holds the roller and is displaceable with respect to the mover. The first biasing member applies a first biasing force to the roller holder to press the roller against the mover. The second biasing member applies a second biasing force greater than the first biasing force to the roller holder to press the roller against the mover.

21 Claims, 7 Drawing Sheets

(56) References Cited

U.S. PATENT DOCUMENTS

| | | | | |
|---|---|---|---|---|
| 2011/0058859 | A1 | 3/2011 | Nakamatsu et al. | |
| 2011/0293312 | A1* | 12/2011 | Mimbu | G03G 15/1645 399/88 |
| 2012/0237260 | A1* | 9/2012 | Sengoku | G03G 15/161 198/813 |
| 2014/0241744 | A1 | 8/2014 | Ichikawa et al. | |
| 2015/0212454 | A1* | 7/2015 | Ichikawa | G03G 15/1685 399/121 |
| 2015/0268591 | A1 | 9/2015 | Fujita et al. | |
| 2016/0033915 | A1 | 2/2016 | Kumagai et al. | |
| 2020/0333731 | A1* | 10/2020 | Murakami | G03G 15/1615 |

* cited by examiner $$SF1 = \frac{(MXLNG)^2}{AREA} \times \frac{\pi}{4} \times 100$$

$$SF2 = \frac{(PERI)^2}{AREA} \times \frac{1}{4\pi} \times 100$$

BIASING FORCE ADJUSTING DEVICE, TRANSFER DEVICE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2021-140590, filed on Aug. 31, 2021, in the Japan Patent Office, the entire disclosure of which is hereby incorporated by reference herein.

BACKGROUND

Technical Field

Embodiments of this disclosure relate to a biasing force adjusting device, a transfer device, and an image forming apparatus.

Related Art

In the related art, an image forming apparatus is generally known that includes an image bearer, an intermediate transfer belt, a primary transferor, and a secondary transferor. Such an image forming apparatus may further include a transfer-nip-pressure adjusting member to adjust the pressure of a transfer nip depending on the thickness of a recording medium.

SUMMARY

In an embodiment of the present disclosure, there is provided a biasing force adjusting device that includes a roller, a roller holder, a first biasing member, and a second biasing member. The roller faces a mover. The roller holder holds the roller and is 5 displaceable with respect to the mover. The first biasing member applies a first biasing force to the roller holder to press the roller against the mover. The second biasing member applies a second biasing force greater than the first biasing force to the roller holder to press the roller against the mover.

In another embodiment of the present disclosure, there is provided a transfer device that includes the biasing force adjusting device.

In still another embodiment of the present disclosure, there is provided an image forming apparatus that includes the transfer device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1A:
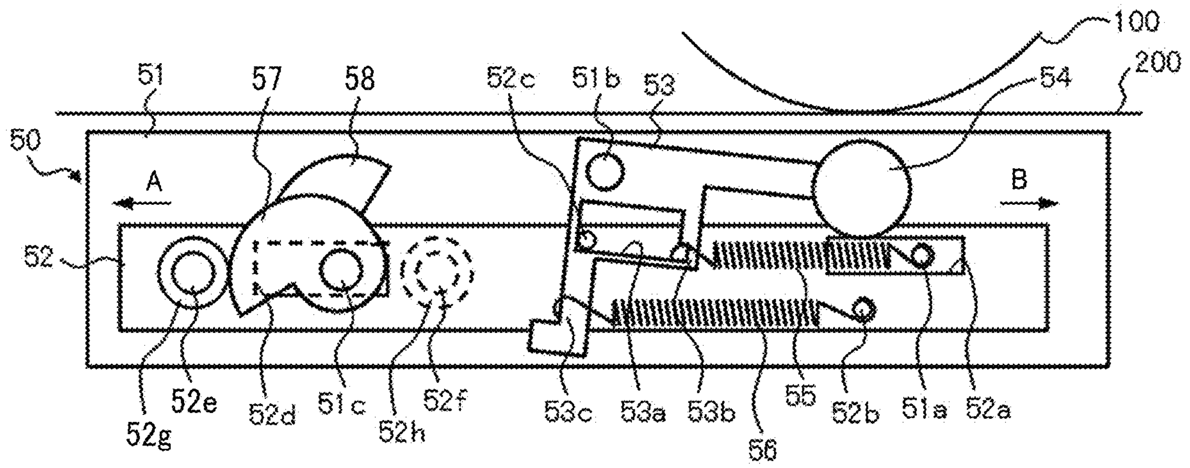
FIG. 1A is a front view of a biasing force adjusting device in a separation state of a roller, according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Figure 1B:
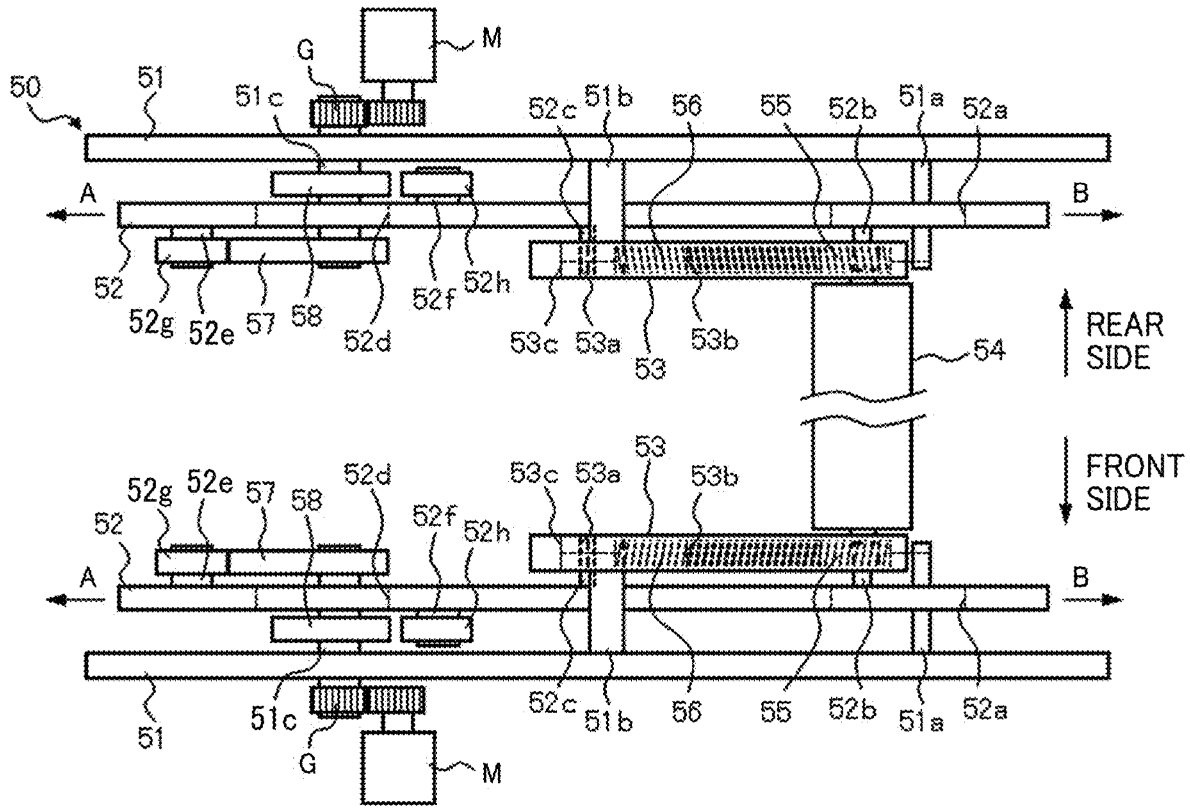
FIG. 1B is a top view of the biasing force adjusting device illustrated in FIG. 1A.

FIGS. 1A and 1B are views of a biasing force adjusting device in a separation state of a roller, according to an embodiment of the present disclosure. FIG. 1A is a front view of the biasing force adjusting device in the separation state of the roller, and FIG. 1B is a top view of the biasing force adjusting device in FIG. 1A.

A biasing force adjusting device 50 includes side plates 51, sliders 52, arms 53, and a roller 54.

Each of the side plates 51 forms a main body frame of the biasing force adjusting device 50 and holds a locking member 51*a*, a shaft 51*b*, and a shaft 51*c*, One end of each of the locking member 51*a* and the shaft 51*b* is fixed to the side plate 51. One end of the shaft 51*c* penetrates through the side plate 51. A power transmission mechanism (a gear G in the present embodiment) that transmits power from a drive motor M is disposed at a portion of the shaft 51*c* that projects outside the side plate 51. As described above, the side plate 51 is provided with the locking member 51*a*, the shaft 51*b*, and the shall 51*c*. Each of the locking member 51*a* and the shaft 51*b* is fixed to a certain position, and the shaft 51*c* is rotatably supported at a certain position.

Next, a configuration of the slider 52 is described. The slider 52 is movable in left-right directions (e.g., a direction indicated by an arrow A and a direction indicated by an arrow B) with respect to the side plate 51 and includes an elongated hole 52*a*, a locking member 52*b*, a locking member 52*c*, an elongated hole 52*d*, a shaft 5:2*e*, and a shaft 52*f*. The 5 elongated hole 52*a* is a through-hole formed along movement directions (left-right directions) of the slider 52. The locking member 51*a* disposed on the side plate 51 can enter the elongated hole 52*a*. This configuration avoids interference between the slider 52 and the locking member 51*a* when the slider 52 moves in the left-right directions.

One end of the locking member 52*b* and one end of the locking member 52*c* are fixed to the slider 52. When the slider 52 moves in the left-right directions, the locking member 52*b* and the locking member 52*c* also move together with the slider 52. The elongated hole 52*d* is a through hole formed along the movement directions (left-right directions) of the slider 52 in the same manner as the elongated hole 52*a* described above. The shaft 51*c* provided on the side plate 51 can enter the elongated hole 52*d*. This configuration avoids interference between the slider 52 and the shaft 51*c* when the slider 52 moves in the left-right directions.

One end of the shaft 52*e* is fixed to the slider 52. A rotator 52*g* such as a ball bearing is attached to the other end of the shaft 52*e*. The shaft 52*f* is disposed on a side surface of the slider 52 facing the side plate 51, i.e., the side surface opposite to the side on which the shaft 52*e* is disposed. One end of the shaft 52*f* is fixed to the slider 52. A rotator 52*h* such as a ball bearing is attached to the other end of the shaft 52*f*. Accordingly, the shaft 52*e* and the shaft 52*f* also move together with the slider 52 when the slider 52 moves in the left-right directions. As described above, the slider 52 includes the locking members 52*b* and 52*c*, the shafts 52*e* and 52*f*, and the elongated holes 52*a* and 52*d* which are fixed at certain positions, and is movable to the left-right directions without interfering with the locking member 51*a*, the shaft 51*b*, and the shaft 51*c* of the side plate 51.

Next, a configuration of the arms 53 is described. Each of the arms 53 has a substantially L-shape. The vicinity of a bent portion of the L-shape of the arm 53 is supported by the shaft 51*b* of the side plate 51. As a result, the arm 53 can rotate around the shaft 51*b* as a fulcrum. The arm 53 includes an elongated hole 53*a*, a locking portion 53*b*, and a locking portion 53*c*.

The elongated hole 53*a* is a through hole into which the locking member 52*c* disposed on the slider 52 can enter. The elongated hole 53*a* restricts the amount of rotation of the arm 53 by means of a contact between an inner surface of the elongated hole 53*a* and the locking member 52*c*. In the present embodiment, when the roller 54 is lowered as illustrated in FIG. 1A, the locking member 52*c* contacts a lower left portion of the inner surface of the elongated hole 53*a* to position the arm 53.

The locking portion 53*b* locks one end of a spring 55. In the present embodiment, the locking portion 53*b* is formed as a stepped portion by cutting off a portion (lower right portion of the inner surface) of the elongated hole 53*a*. The other end of the spring 55 is locked with the locking member 51*a* protruding from the side plate 51 through the elongated hole 52*a* of the slider 52. The locking portion 53*c* locks one end of a spring 56. In the present embodiment, the locking portion 53*c* is formed as a bent portion at a portion (bottom end) of the arm 53. The other end of the spring 56 is locked with the locking member 52*b* of the slider 52. The arms 53, in a pair, support the roller 54 at upper ends (leading ends) thereof.

As described above, each of the arms 53 includes the elongated hole 53*a*, the locking portion 53*b*, and the locking portion 53*c*. When the biasing force of the spring 55 hooked on the locking portion 53*b* and the locking member 51*a* and the biasing force of the spring 56 hooked on the locking portion 53*c* and the locking member 52*h* are changed, the arm 53 rotates around the shaft 51*b* as a fulcrum.

The biasing forces of the springs 55 and 56 can be changed by switching the position of the slider 52 using cams 57 and 58. The cams 57 and 58 are disposed on the shaft 51*c* held by the side plate 51. The cam 57 has a cam surface contactable with an outer circumferential surface of the rotator 52*g* disposed on the slider 52. The cam 58 has a cam surface that is contactable with an outer circumferential surface of the rotator 52*h* disposed on the side surface of the slider 52 facing the side plate 51, i.e., opposite to the side on which the rotator 52*g* is disposed.

In the above-described configuration, in the state illustrated in FIG. 1, the outer circumferential surface of the rotator 52*g* contacts the cam 57 to regulate a movement of the slider 52 in the right direction (direction indicated by the arrow B). The springs 55 and 56 pull the arm 53 and bias the arm 53 in the counterclockwise direction with the shaft 51*b* as a fulcrum. The locking member 52*c* contacts the lower left portion of the inner surface of the elongated hole 53*a* disposed in the arm 53. The arm 53 cannot move further in the counterclockwise direction. As a result, the roller 54 is separated from a mover 200 that moves above the roller 54 and a rotator 100 disposed via the mover 200.

In the present embodiment, the biasing force applied to the arm 53 by the springs 55 and 56 is set such that the biasing force of the spring 56 is greater than the biasing force of the spring 55, Tension springs are used as the springs 55 and 56. This configuration enables to reduce errors more than a compression spring.

In the present embodiment, the drive motors M to drive the cams 57 and 58 are disposed on the front side and the rear side, respectively. However, the configuration of driving the cams 57 and 58 are not limited to such a configuration. For example, the 5 following configuration is possible in which the shaft 51*c* has a length that straddles the front and rear side plates 51. In this configuration, the front and rear cams 57 and 58 may be attached on the single shaft 51*c*, and a single drive motor M may drive the front and rear cams 57 and 58.

The arm 53 is an example of a "roller holder". The spring 55 is an example of a "first biasing member". The spring 56 is an example of a "second biasing member". The shaft 51*b* is an example of a "rotation shaft". The slider 52 is an example of a "movable body". The cam 57 and the cam 58 are examples of a "regulator".

Figure 2A:
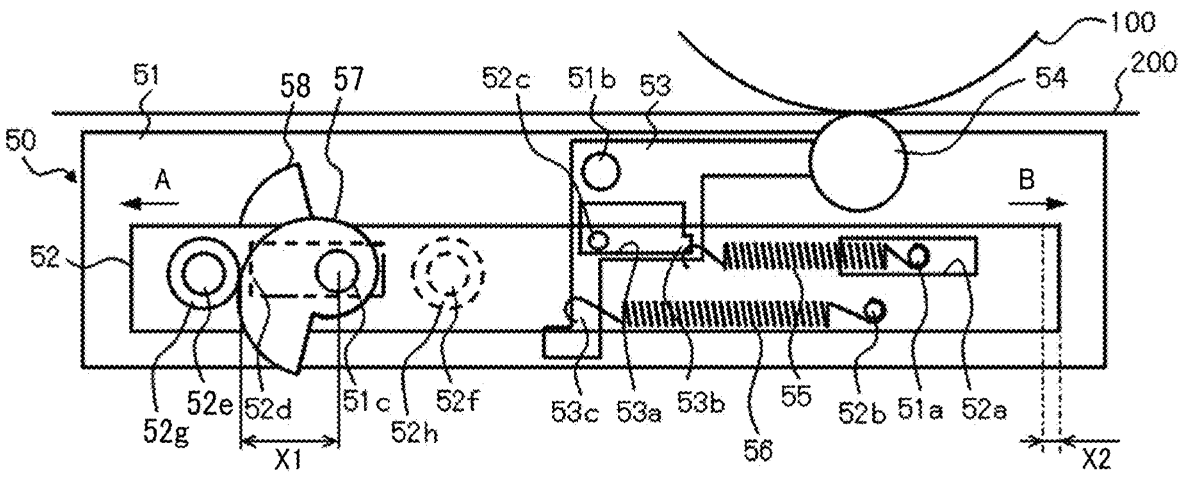
FIG. 2A is a front view of the biasing force adjusting device in a contact state of the roller, according to an embodiment of the present disclosure.
Figure 2B:
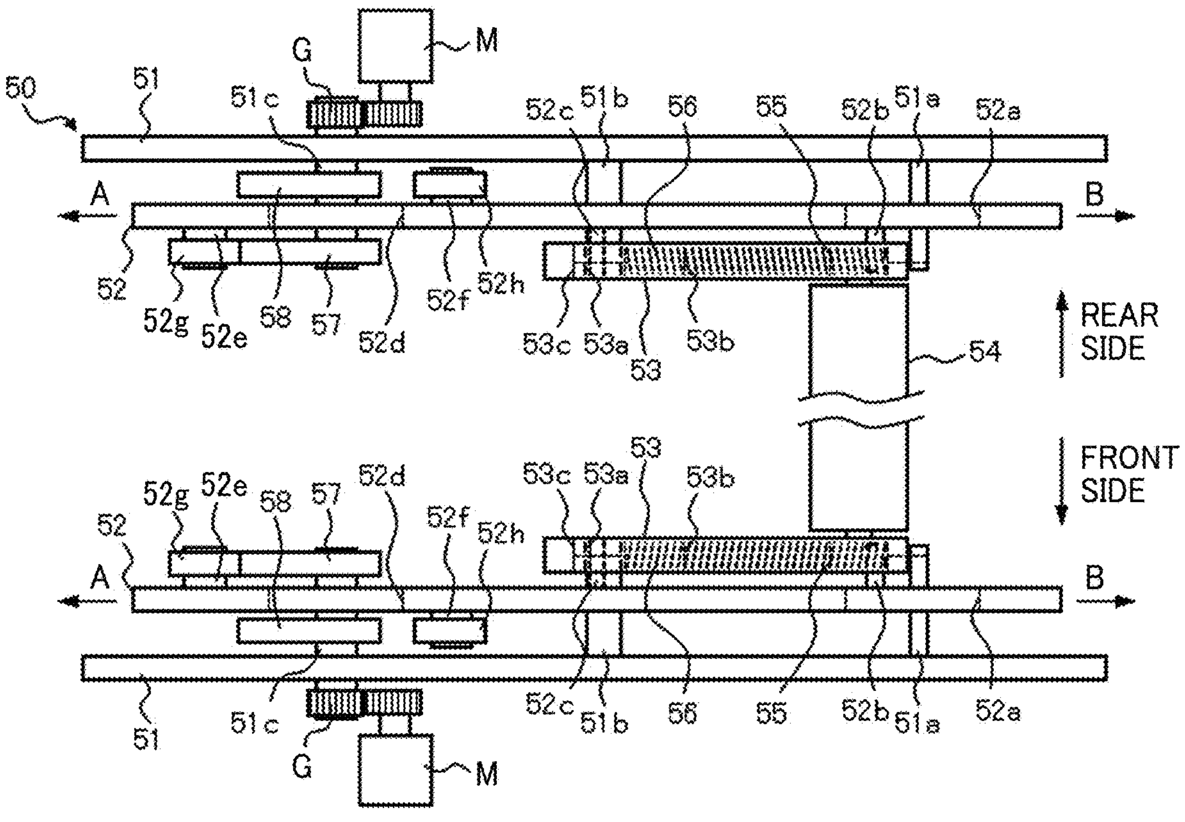
FIG. 2B is a top view of the biasing force adjusting device illustrated in FIG. 2A.

FIGS. 2A and 2B are views of the biasing force adjusting device in a contact state of the roller, according to an embodiment of the present disclosure. FIG. 2A is a front view of the biasing force adjusting device in the contact state of the roller, and FIG. 2B is a top view of the biasing force adjusting device illustrated in FIG. 2A. Identical components are given identical reference numerals used in FIG. 1, and redundant descriptions are omitted.

When the cam 57 rotates around the shaft 51*c* as the rotation axis in the counterclockwise direction, a distance X1 (see FIG. 2A) from the shaft 51*c* to a contact position of the rotator 52*g* is shorter than in the separation state of the roller illustrated in FIG. 1A due to the shape of the cam surface of the cam 57. Then, the slider 52 moves to the right direction (direction indicated by the arrow B) by a shortened distance X2 (see FIG. 2A). With the movement of the slider 52 in the right direction, the contact between the elongated hole 53*a* of the arm 53 and the locking member 52*c* of the slider 52 is released. The arm 53 rotates around the shaft 51*b* by the action of the springs 55 and 56 in the counterclockwise direction. As a result, the roller 54 is in contact with the mover 200 and the rotator 100. The contact state illustrated in FIG. 2A is an example of "first contact position".

In this case, the contact of the roller 54 with respect to the mover 200 is formed by applying only the biasing force (tensile force) of the spring 55 toward the arm 53. The spring 56 is in a free length state. As a result, such a configuration can reduce a deviation of the biasing force with respect to the mover 200 and the rotator 100. The biasing force applied to the arm 53 by the spring 55 is an example of a "first biasing force".

Figure 3A:
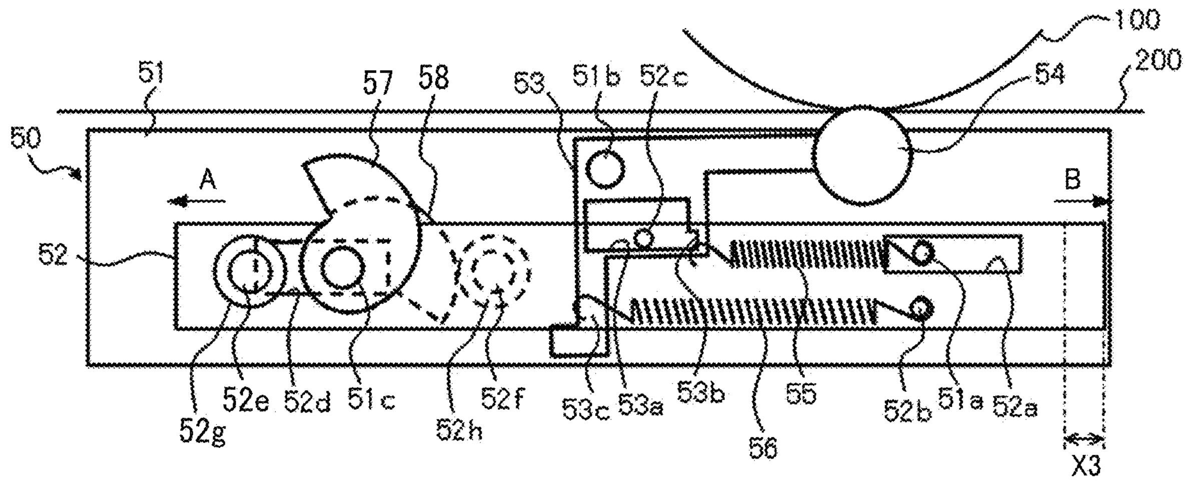
FIG. 3A is a front view of the biasing force adjusting device in a reinforced contact state of the roller, according to an embodiment of the present disclosure.
Figure 3B:
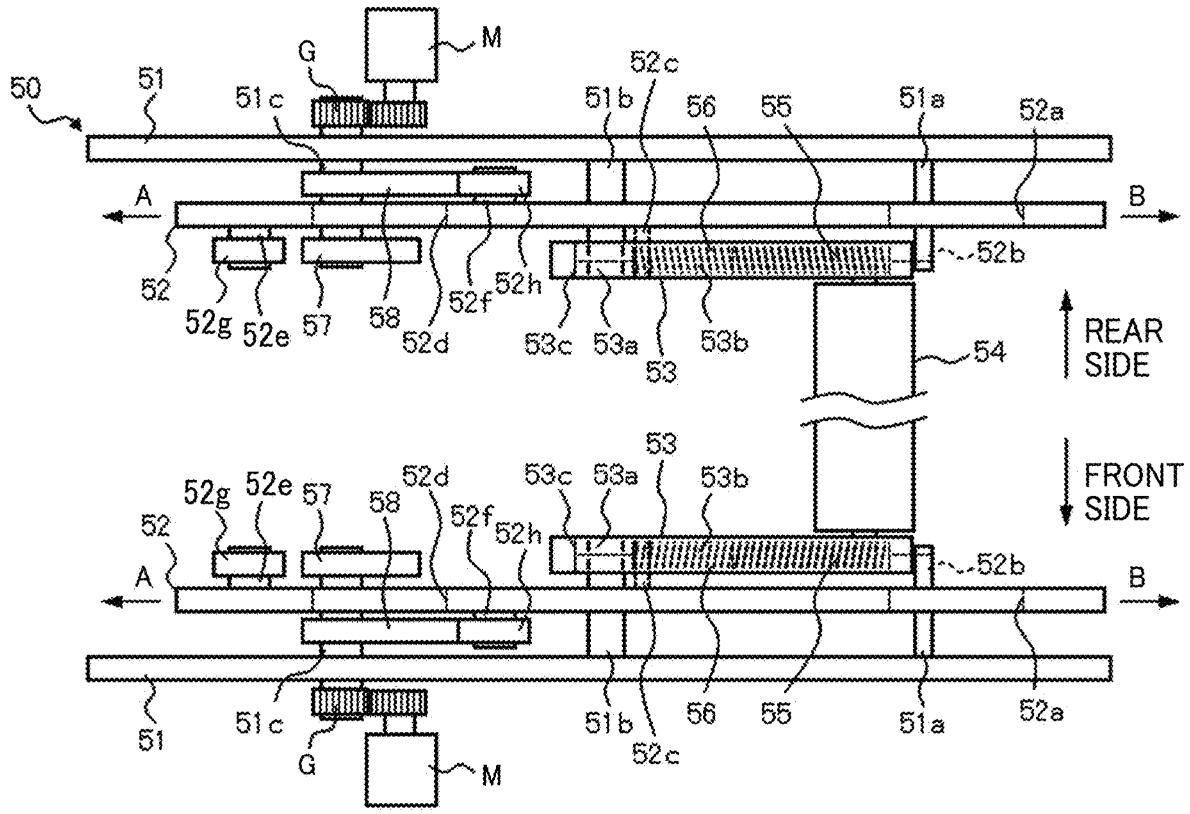
FIG. 3B is a top view of the biasing force adjusting device illustrated in FIG. 3A.

FIGS. 3A and 3B are views of the biasing force adjusting device in a reinforced contact state of the roller, according to an embodiment of the present disclosure. FIG. 3A is a front view of the biasing force adjusting device in the reinforced contact state of the roller), and FIG. 3B is a top view of the biasing force adjusting device illustrated in FIG. 3A.

When the cam 57 is further rotated in the counterclockwise direction from the state illustrated in FIG. 2A, the cam 57 ceases to contact the rotator 52*g*. Thus, the slider 52 moves to the right direction (direction indicated by the arrow B) by a distance X3 (see FIG. 3A) from the contact state of the roller illustrated in FIG. 2A. The arm 53 rotates around the shaft 51*b* in the counterclockwise direction by the action of the springs 55 and 56. When the cams 57 and 58 further rotate in the counterclockwise direction, the cam 58 disposed coaxially with the cam 57 contacts the rotator 52*h*, thereby restricting the movement of the slider 52 in the right direction (direction indicated by the arrow B). As a result, the roller 54 contacts the mover 200 and the rotator 100 more strongly than in the contact state illustrated in FIGS. 2A and 2B. The reinforced contact state illustrated in FIGS. 3A and 3B is an example of a "second contact position".

In this case, the contact of the roller 54 with respect to the mover 200 is formed by applying only the biasing force (tensile force) of the spring 56 to the arm 53. Thus, the spring 55 is in a free length state. In the present embodiment, the tensile force of the spring 56 is twice the tensile force of the spring 55. The biasing force applied to the arm 53 by the spring 56 is an example of a "second biasing force".

As described above, in the present embodiment, the biasing force adjusting device includes the roller 54, the arm 53, the spring 55, and the spring 56. The roller 54 faces the mover 200. The arm 53 holds the roller 54 and is displaceable with respect to the mover 200. The spring 55 applies the first biasing force to the arm 53 and causes the roller 54 to contact the mover 200. The spring 56 applies the second biasing force larger than the first biasing force to the arm 53 and causes the roller 54 to contact the mover 200.

As described above, the arm 53 includes the shaft 51*b* that rotatably supports the arm 53. The arm 53 is rotated by at least one of the first biasing force and the second biasing force with the shaft 51*b* as a fulcrum.

As a result, the biasing force adjusting device that adjusts the biasing force with a small error can be provided.

As described above, the spring 55 applies the first biasing force to the arm 53 to form a contact between the mover 200 and the roller 54 at a first contact position.

As described above, the spring 56 applies the second biasing force to the arm 53 to form the contact between the mover 200 and the roller 54 at a second contact position different from the first contact position.

As described above, the contact force between the mover 200 and the roller 54 at the second contact position is defined to be larger than the contact force between the mover 200 and the roller 54 at the first contact position.

As described above, when the first biasing force and the second biasing force are not applied to the arm 53, the roller 54 is separated from the mover 200.

As a result, a deviation of the biasing force with respect to the mover 200 and the rotator 100 can be reduced.

As described above, the arm 53, the spring 55, and the spring 56 are interlocked with the movement of the slider 52 that is movable in a predetermined direction (in the present embodiment, the left-right direction) to enable switching among a state where the mover 200 and the roller 54 contact with each other at the first contact position, a state where the mover 200 and the roller 54 contact with each other at the second contact position, and a state where the roller 54 is separated from the mover 200.

As described above, the slider 52 includes the cams 57 and 58 that restrict the movement of the slider 52 in the predetermined direction.

As described above, the plurality of cams 57 and 58 are provided. The plurality of cams 57 and 58 are coaxially rotatable.

As a result, the arm 53, the spring 55, and the spring 56 move together with the movement of the slider 52 to accurately switch among the contact state, the reinforced contact state, and the separation state of the roller 54.

Figure 4:
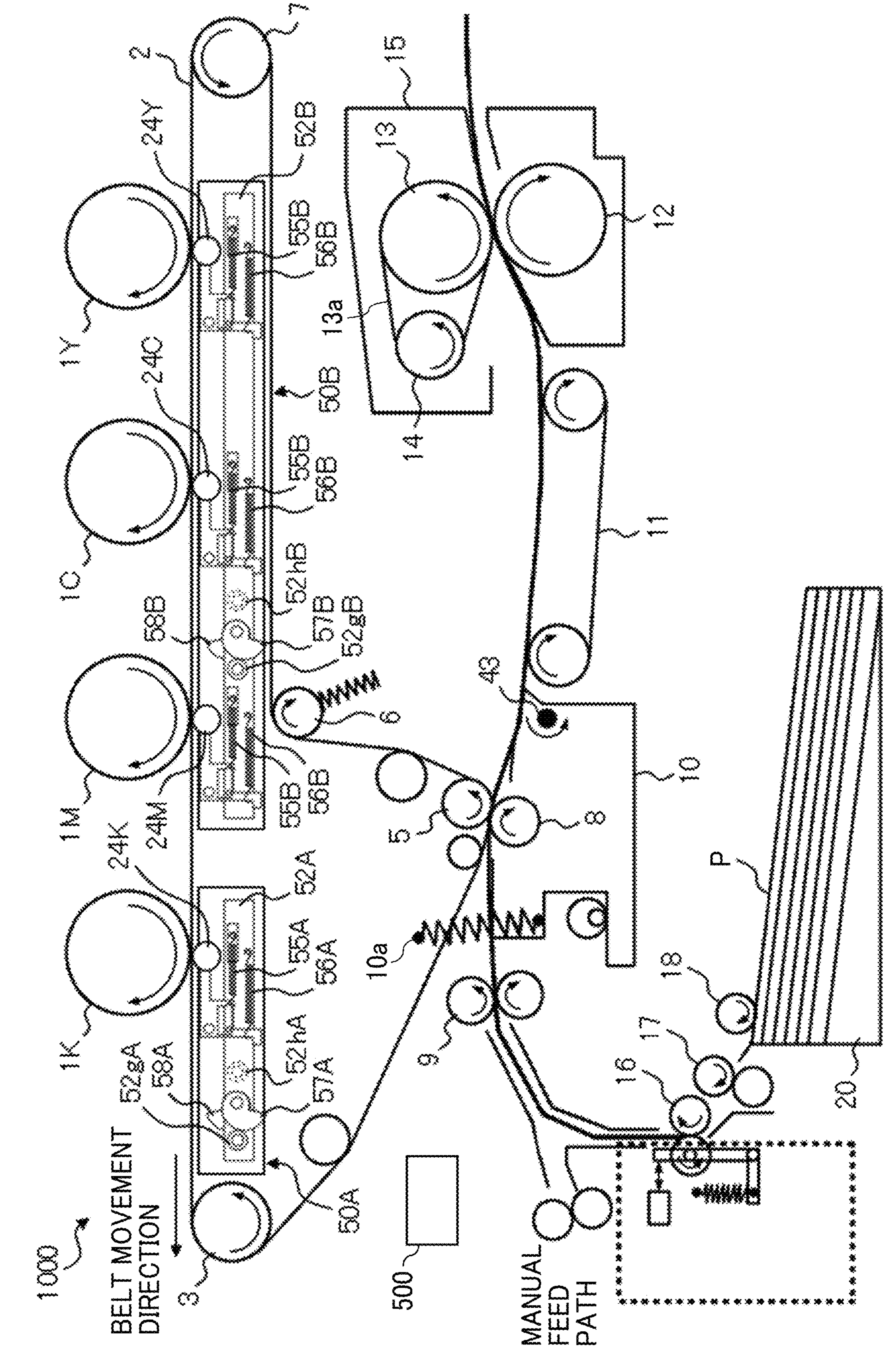
FIG. 4 is a schematic view of an image forming apparatus in which the biasing force adjusting device is applied to a transfer device, according to an embodiment of the present disclosure.

FIG. 4 is a schematic view of an image forming apparatus in which the biasing force adjusting device is applied to a transfer device, according to the embodiment of the present disclosure.

A printer 1000 serving as an image forming apparatus according to the present embodiment includes four sets of image forming units using toner of, for example, four colors (yellow (Y), cyan (C), magenta (M), and black (K)). An intermediate transfer belt 2 serving as an intermediate transferor that transfers toner images formed by the image forming units is disposed below the image forming units. In other words, the printer 1000 is a tandem-type image forming apparatus in which the four image forming units are arranged in parallel along the moving direction of the intermediate transfer belt 2. Note that, since these image forming units have substantially the same configuration except for the difference in the color of the developer (toner), the suffixes of Y, C. M, and K in the reference numerals are appropriately omitted in the following description.

Each image forming unit includes a photoconductor drum 1 as an image bearer, and includes a charging device, an exposure device, a developing device, a photoconductor cleaner around the photoconductor drum 1. The charging device charges a surface of the photoconductor drum 1. The exposure device exposes the charged surface of the photoconductor drum 1 with laser light based on image data obtained by reading a document conveyed from an automatic document feeder (ADF) by an image scanner and forms a latent image on the surface of the photoconductor drum 1. Note that the image data is not limited to image data read by the image scanner and may be image data received from a personal 5 computer (PC). The developing device visualizes the latent image formed on the photoconductor drum 1 as a toner image. The photoconductor cleaner cleans the surface of the photoconductor drum 1.

The photoconductor drums 1 of the four image forming units are rotated in directions indicated by arrows in FIG. 4 by a photoconductor drum driver. Note that a photoconductor drum 1K for black may be driven to rotate independently from photoconductor drums 1Y, 1C, and MI for color. By so doing, for example, only the photoconductor drum 1K for black can be driven to rotate in the case of forming a monochrome image. In the case of forming a color image, the four photoconductor drums 1Y, 1C, 1M, and 1K can be driven to rotate simultaneously.

The intermediate transfer belt 2 is wound around a plurality of support rollers such as a secondary transfer counter roller 5, a support roller 3, and a support roller 7. The support roller 3 is a driving roller that is driven to rotate by a drive motor to convey the intermediate transfer belt 2 in a counterclockwise direction in FIG. 4. On the other hand, the support roller 7 is a driven roller that rotates with the movement of the intermediate transfer belt 2. A roller 6 is a tension roller that contacts the outer circumferential surface of the intermediate transfer belt 2.

A primary transfer roller 24 is disposed to face each photoconductor drum 1 with the intermediate transfer belt 2 interposed therebetween at a primary transfer position where a toner image is transferred from each photoconductor drum 1 to the intermediate transfer belt 2. Primary transfer rollers 24Y, 24C, and 24M are provided with contact and separation mechanisms to separate the primary transfer rollers 24Y, 24C, and 24M from the photoconductor drums 1C, and 1M for a color image in a case of forming a monochrome image. The primary transfer rollers 24Y, 24C, 24M and 24K are separated from the photoconductor drums 1Y, 1C, 1M and 1K in a case where no image formation is performed.

Each primary transfer roller 24 contacts the intermediate transfer belt 2 such that the intermediate transfer belt 2 presses and contacts the photoconductor drum 1 and forms a primary transfer nip at a position facing the photoconductor drum 1. A secondary transfer roller 8 is disposed below the intermediate transfer belt 2 in FIG. 4 and contacts the secondary transfer counter roller 5 via the intermediate transfer belt 2 to form a secondary transfer nip. A secondary transfer unit 10 including the secondary transfer roller 8 includes a rotation shaft 43 downstream in a traveling direction of the intermediate transfer belt 2 and is rotatable around the rotation shaft 43 as a fulcrum.

The secondary transfer roller 8 is disposed to be pressed against the secondary 5 transfer counter roller 5 via the intermediate transfer belt 2 by a load of the tension of a secondary transfer pressure spring 10*a*. The image on the intermediate transfer belt 2 is transferred onto a sheet P by the pressing force of the secondary transfer roller 8 and a secondary transfer bias. A conveying belt 11 that conveys the sheet P toward a fixing device 15 is disposed downstream from the secondary transfer unit 10 in the sheet conveyance direction. The fixing device 15 that fixes an unfixed image transferred onto the sheet P is disposed further downstream from the conveying belt 11.

A pressure roller 12 is pressed against a fixing belt 13*a* extended between a fixing roller 13 and a heating roller 14 in the fixing device 15. The fixing belt 13*a* is heated by an induction heating (IH) coil in the heating roller 14 to a temperature required for image fixing. On the other hand, the pressure roller 12 also has a heater therein. The heater is used for preliminary heating during standby. Heat and pressure are applied to the unfixed image on the sheet P at a nip portion between the fixing belt 13*a* and the pressure roller 12, so that the unfixed image is fixed on the sheet P Note that the heater of the fixing device 15 is not limited to the 1H coil. For example, a heat roller pair may be used as the heater of the fixing device 15.

An image forming (printing) operation in the printer 1000 having such a configuration as described above is briefly described. When a color image is formed, each photoconductor drum 1 rotates in a direction indicated by an arrow indicated in FIG. 4. At this time, the charging device charges the surface of each photoconductor drum 1 to a predetermined polarity, for example, a negative polarity. Next, the charged surface of each photoconductor drum 1 is irradiated with optically modulated laser light emitted from the exposure device. An electrostatic latent image is thus formed on the surface of each photoconductor drum 1. That is, a portion where the absolute value of the potential of the surface of the photoconductor drum 1 is lowered by the irradiation of the laser light changes into an electrostatic latent image (image portion). A portion where the absolute value of the potential is high without the irradiation of the laser light changes into a background portion. Next, the developing device develops the electrostatic latent image into a toner image with toner charged to a predetermined polarity and contained in the developing device.

The toner image formed on the photoconductor drum 1 is sequentially superimposed and transferred onto the intermediate transfer belt 2 by the action of the transfer electric field formed on the primary transfer roller 24 and the nipping pressure between the primary transfer roller 24 and the photoconductor drum 1 via the intermediate transfer belt 2. As a result, a full-color toner image, with four-color toner images, is formed on the intermediate transfer belt 2. The transfer residual toner remaining on the photoconductor drum 1 without 5 being transferred onto the intermediate transfer belt 2 is removed by the photoconductor cleaner to clean the surface of each photoconductor drum 1. The toner removed from the photoconductor drum 1 may be conveyed to the developing device with a toner recycling device to recycle the toner.

On the other hand, a feed roller 18 rotates, and a separation roller pair 17 separates the sheets P fed from a sheet tray 20 one by one. A conveying roller pair 16 conveys the separated sheet P between the intermediate transfer belt 2 and the secondary transfer roller 8 at a predetermined timing. The sheet P conveyed by the conveying roller pair 16 hits against and stops at a registration roller pair 9 (positioning roller pair). The sheet P conveyed from a manual feed tray (manual feeder) via a manual feed path similarly hits against and stops at the registration roller pair 9. The registration roller pair 9 adjusts the rotation to the arrival of the full-color toner image on the intermediate transfer belt 2 and feeds the sheet P to the secondary transfer nip formed between the secondary transfer roller 8 and the secondary transfer counter roller 5. Thus, the full-color toner image is transferred onto the sheet P at the secondary transfer nip.

The fixing device 15 heats and presses the sheet P on which the full-color toner image is transferred, fixes the toner image on the sheet P, and ejects the sheet P onto an output tray. Alternatively, the sheet P is guided again to the transfer position by a double-sided reversing mechanism, and an image is recorded on the back face of the sheet P. Thus, the sheet P is ejected onto the output tray after fixing.

The biasing force adjusting device 50 described with reference to FIGS. 1A to 3B is disposed as transfer devices 50A and 50B each including the primary transfer roller 24 in the image forming apparatus according to the present embodiment. In other words, the roller 54 illustrated in FIGS. 1A to 3B is replaced with the primary transfer roller 24, the mover 200 is replaced with the intermediate transfer belt 2, and the rotator 100 is replaced with the photoconductor drum 1.

In the present embodiment, the transfer device 50A for black has the same configuration as the configuration of the biasing force adjusting device 50 described with reference to FIGS. 1A to 3B and is disposed independently of the transfer device 50B for color. On the other hand, the transfer device 50B for color other than black has a configuration such that a single slider 52B holds the three primary transfer rollers 24Y, 24C, and 24M. In other words, the primary transfer rollers 24Y, 24C, and 24M are contacted with and separated from the photoconductor drums 1Y, 1C, and 1M at the same time by the movement of the slider 52B in the left-right directions.

As a result, for example, the primary transfer roller 24K can be contacted with only the photoconductor drum 1K via the intermediate transfer belt 2 when a monochrome image is formed. In the transfer device 50B for color, the number of components such as the slider 52B and cams 57B and 58B can be reduced to simplify the configuration. Thus, the mounting space of the transfer device 50B for color can be reduced to miniaturize the image forming apparatus. The transfer device 50B for color is not limited to the configuration of the present embodiment. For example, the transfer device 50B for color may be disposed as independent transfer devices for yellow, magenta, and cyan similarly to the transfer device 50A for black.

In the image forming apparatus of the present embodiment, the three states (i.e., the separation state, the contact state, and the reinforced contact state of the roller) described with reference to FIGS. 1A to 3B are selectively used as following modes.

The state in which the primary transfer roller 24 is separated from the intermediate transfer belt 2 is a state of "separation mode". For example, the separation mode is set, for example, when an image is not formed, when a toner image is not transferred from the photoconductor drum 1 to the intermediate transfer belt 2, when the power source of the image forming apparatus is turned off, and when the power source is off. For example, the separation mode is set after the power of the image forming apparatus is turned on from a state where the power is off and before image formation.

The state in which the primary transfer roller 24 contacts the intermediate transfer belt 2 is a state of "contact mode". Specifically, for example, the primary transfer roller 24 it 0 presses the intermediate transfer belt 2 for image forming in the contact mode.

The state in which the contact of the primary transfer roller 24 with respect to the intermediate transfer belt 2 is reinforced is a state of "shock jitter mode". For example, the shock jitter mode is set to reduce shock jitter generated in a case where a sheet P having high rigidity enters the nip position of the secondary transfer roller 8.

In the present embodiment, cams 57A and 58A (57B and 58B) contact (separate from) rotators 52*g*A and 52*h*A (52*g*B and 52*h*B), so that a slider 52A (52B) moves in the left-right direction. Then, springs 55A and 56A (55B and 56B) locked to the slider 52A (52B) expand and contract along with the movement of the slider 52A (52B). The tensile forces of the springs 55A and 56A (55B and 56B) can be changed according to the rotation angles of the cams 57A and 58A (57B and 58B), thus allowing mode settings of a plurality of stages.

In the present embodiment, the cams 57A and 58A (57B and 58B) have a cam configuration in which a tensile force is applied only to the spring 55A (55B) in the contact mode and the spring 56A (56B) turns into a free length. The state of the contact mode is set to a default value of a stretching force of the intermediate transfer belt 2. Thus, in the 5 normally used contact mode, the deviation of the stretching force of the intermediate transfer belt 2 can be reduced.

When shock jitter occurs in the state of the default value (contact mode), the cams 57A and 58A (57B and 58B) are rotated to move the slider 52A (52B) in the right direction. The spring 56A (56B) interlocking with the slider 52A (52B) is pulled to rotate the arm 53A (53B) counterclockwise. Thus, the primary transfer roller 24 contacts the intermediate transfer belt 2 with stronger force. Accordingly, an influence on the intermediate transfer belt 2 due to an impact when the sheet P having high rigidity enters the nip position of the secondary transfer roller 8 can be reduced. The springs 55A and 56A (55B and 56B) use tension springs to reduce errors compared to compression springs.

Figure 5A:
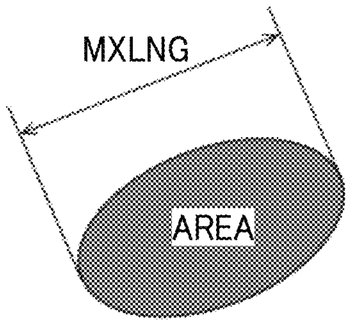
FIG. 5A is a diagram illustrating a shape coefficient SF1.
Figure 5B:
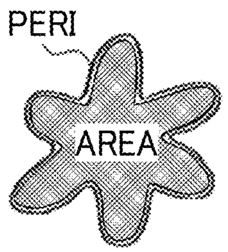
FIG. 5B is a diagram schematically illustrating the shape of toner for illustrating shape coefficient SF2.

FIGS. 5A and 5B are diagrams illustrating an example of toner used in the image forming apparatus, according to an embodiment of the present disclosure. FIG. 5A is a diagram illustrating a shape coefficient SF1, and FIG. 5B is a diagram schematically illustrating the shape of the toner for illustrating a shape coefficient SF2.

The shape coefficient SF1 of the toner used in the present embodiment is preferably in a range of 100 to 180, and the shape coefficient SF2 is preferably in a range of 100 to 180. The shape coefficient SF1 indicates a ratio of roundness of the toner shape and can be expressed by Equation (I). The shape coefficient SF1 is a value obtained by dividing the square of the maximum length NIXING of a shape formed by projecting the toner on a two-dimensional plane by the figure area AREA and multiplying the result by 100π/4.

$$SF1=((\mathrm{MXLNG})^2/\mathrm{AREA})\times(\pi/4)\times100 \quad \text{Equation (1).}$$

In a case where the value of SF1 is 100, the shape of the toner is a true sphere and leads to be indeterminate in form as the value of SF1 increases.

The shape coefficient SF2 indicates the ratio of unevenness of the toner shape and can be expressed by Equation (2). The shape coefficient SF2 is a value obtained by dividing the square of the peripheral length PERI of a figure formed by projecting the toner on a two-dimensional plane by the figure area AREA and multiplying the result by 100/4π.

$$SF2=((\mathrm{PERI})^2/\mathrm{AREA})\times(1/4\pi)\times100 \quad \text{Equation (2).}$$

In a case where the value of SF2 is 100, no unevenness is on the toner surface. As the value of SF2 increases, the unevenness on the toner surface is more prominent.

The shape coefficient was measured by taking a photograph of the toner with a scanning electron microscope (S-800 manufactured by Hitachi, Ltd.), introducing the photograph into an image analyzer (LUSEX3 manufactured by NIRECO CORPORATION), analyzing data, and calculating the shape coefficient. When the shape of the toner is nearly 5 spherical shape, the contact state between particles of the toner or between the toner and the photoconductor drum is point contact, so that an adsorption force between particles of the toner is weak and fluidity is high. Thus, the adsorption force between the toner and the photoconductor drum also is weak and a transfer rate is high. When either of the shape coefficients SF1 and SF2 exceeds 180, the transfer rate is lowered and the cleaning property in a case in which the toner adheres to a transferor is also lowered, which is undesirable.

The toner particle diameter is preferably in the range of 4 to 10 μm in terms of volume average particle diameter. When the toner particle diameter is smaller than this range, background stains, deterioration of the fluidity, and aggregation are likely to occur at the time of development, so that a toner void is likely to occur. In contrast, when the toner particle diameter is larger than above-described range, a high-definition image is not obtained due to scattering of the toner and deterioration of resolution. Based on the above-described description, in the present embodiment, the toner having a volume average particle diameter of 6.5 μm is used.

Figure 6:
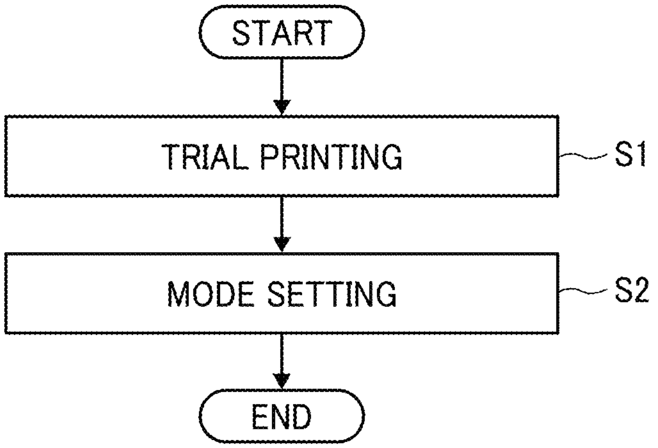
FIG. 6 is a flowchart of a process of selling a shock jitter mode in the image forming apparatus, according to an embodiment of the present disclosure.

FIG. 6 is a flowchart of a process of setting the shock jitter mode in the image forming apparatus, according to an embodiment of the present disclosure.

In the setting of the shock jitter mode, first, trial printing is performed for each paper thickness of the sheet (paper) P used in the printer 1000 (in step S1 of FIG. 6). In the trial printing, a user checks whether horizontal stripes appear in an image formed on the sheet P. Appearance of the horizontal stripes in the image means that the shock jitter occurs due to an entry of the sheet P having high rigidly into the nip position of the secondary transfer roller 8 of the printer 1000.

When the horizontal stripes appear in the image of the trial printing, the user sets the mode of the transfer devices 50A and 50B at the time of using the sheet P in which the horizontal stripes have occurred to be the "shock jitter mode" on an operation panel of the printer 1000 (in step S2 of FIG. 6). The content of the mode setting for each sheet thickness is stored in, for example, a memory disposed in the printer 1000.

Figure 7:
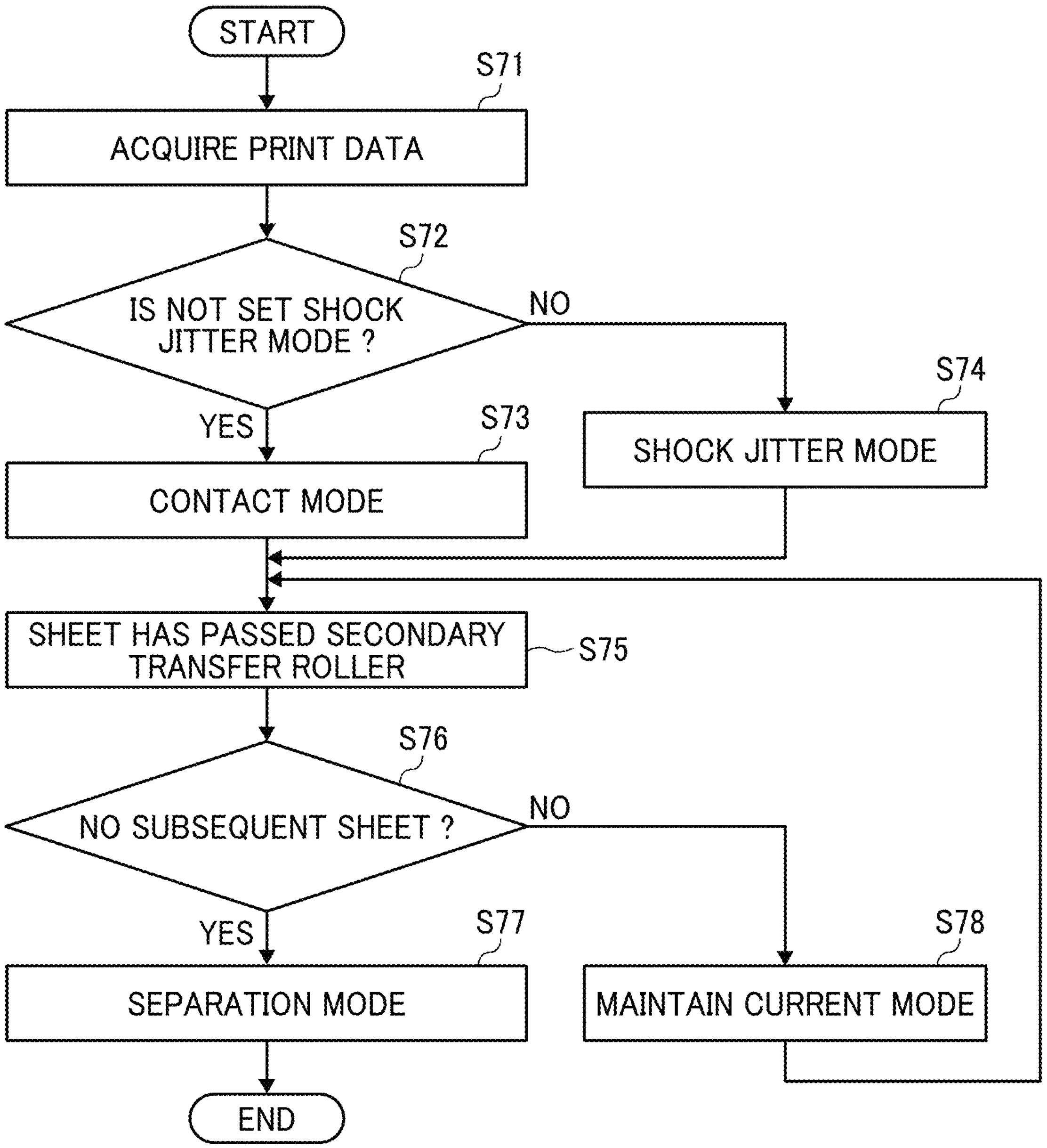
FIG. 7 is a flowchart of a process of executing the shock jitter mode in the image forming apparatus, according to an embodiment of the present disclosure.

FIG. 7 is a flowchart of a process of executing the shock jitter mode in the image forming apparatus, according to the embodiment of the present disclosure.

When the printer 1000 starts a printing operation, the printer 1000 acquires print data (for example, image data, or paper-type data) from a controller 500 (see FIG. 4) (in step S71 of FIG. 7). Next, the controller 500 determines whether the sheet P to be used is the sheet P for which the shock jitter mode has been set in the above-described setting flowchart based on the print data acquired in step S71 (in step S72 of FIG. 7). In step S72, when the controller 500 determines that the shock jitter mode is not set (YES in step S72 of FIG. 7), the controller 500 causes the primary transfer rollers 24 of the transfer devices 50A and 50B to contact the intermediate transfer belt 2 in the "contact mode" (in step S73 of FIG. 7).

On the other hand, in step S72, when the controller 500 determines that the shock jitter mode is set (NO in step S72 of FIG. 7), the controller 500 causes the primary transfer rollers 24 of the transfer devices 50A and 50B to contact the intermediate transfer belt 2 in the "shock jitter mode" (in step S74 of FIG. 7). The controller 500 performs image formation in the contact mode or the shock-jitter mode. When the sheet P has passed the nip position between the intermediate transfer belt 2 and the secondary transfer roller 8 (in step S75 of FIG. 7), the controller 500 determines whether there is no subsequent sheet (in step S76 of FIG. 7). In step S76, when the controller 500 determines that no subsequent sheet is after the sheet P (YES in step S76 of FIG. 7), the controller 500 causes the primary transfer rollers 24 of the transfer devices 50A and 50B to form the "separation mode" with respect to the intermediate transfer belt 2 (in step S77 of FIG. 7) and ends the printing operation. In step S76, when the controller 500 determines that there is any subsequent sheet (NO in step S76 of FIG. 7), the controller 500 continues to print on the subsequent sheet until there is no subsequent sheet while maintaining the current mode (the contact mode or the shock jitter mode) (in step S78 of FIG. 7).

In this manner, the controller 500 does not perform a mode change when there is any subsequent sheet to prevent, for example, image disturbance during the primary transfer of the image to be transferred to the next subsequent sheet from the photoconductor drum 1 to the intermediate transfer belt 2. Even if the controller 500 determines to set the "shock jitter mode" in step S72, for example, if the number of printing sheets is only one, the controller 500 may perform the printing operation in the "contact mode" instead of the "shock jitter mode". The shock jitter is a phenomenon in which an impact (vibration) generated when the sheet P having high rigidity enters the nip position of the secondary transfer roller 8 is transmitted to the intermediate transfer belt 2 and horizontal stripes are generated on an image on the intermediate transfer belt 2 to be transferred to the next subsequent sheet. Accordingly, when the number of printing sheets is only one, transferability of the toner to the subsequent sheet is not necessary to be considered.

Figure 8:
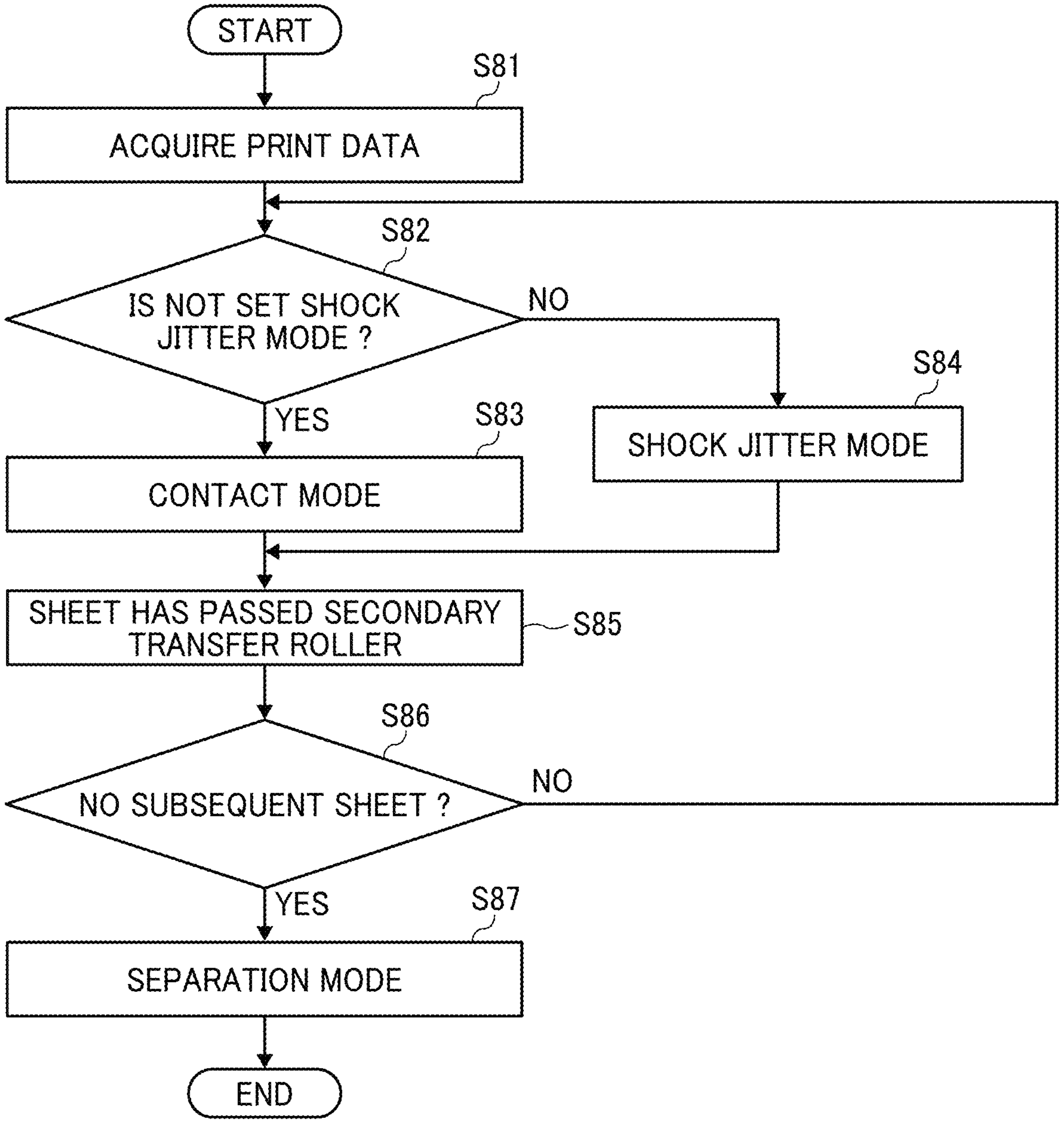
FIG. 8 is a flowchart of a process of executing the shock jitter mode in the image forming apparatus, according to a modification of the process of FIG. 7.

FIG. 8 is a flowchart of a process of executing the shock jitter mode in the image forming apparatus, according to a modification of the process of FIG. 7, Since steps S81 to S87 of the present modification are equivalent to steps S71 to S77 of the executing flowchart illustrated in FIG. 7, description of each step is omitted.

The present modification is different from the flowchart in FIG. 7 in a point that the flowchart returns to step S82 (determination of the setting state of the shock jitter mode) when the controller 500 determines that there is any subsequent sheet in step S86 (NO in S86 of FIG. 8). In other words, in the case of the present modification, the controller 500 determines whether the subsequent sheet is in the shock jitter mode each time. After the determination, the controller 500 starts formation of an image to be transferred to the subsequent sheet. Since a state in which the primary transfer roller 24 strongly contacts the intermediate transfer belt 2 in the shock jitter mode is not preferable in terms of transfer performance compared to the contact mode, the contact mode is desirably to be set in a case of a sheet in which the horizontal stripes do not occur. In the present modification, the controller 500 determines whether the sheet P is in the shock jitter mode for each sheet. Thus, a suitable image transfer can be performed for each sheet.

In the present embodiment, a description is given based on an example in which the biasing force adjusting device is applied to the transfer device of the image forming apparatus. However, the application is not limited to this. For example, a biasing force adjusting device according to an embodiment of the present disclosure can be appropriately applied to an apparatus including a roller that contacts an endless belt-shaped or long mover, such as a conveying device including a conveying belt that conveys a recording medium such as paper and a fixing device including a fixing belt.

The above-described embodiment is one of examples. The present disclosure can provide, for example, some advantages in the following aspects.

According to a first aspect, a biasing force adjusting device includes a roller (e.g., roller 54), a roller holder (e.g., arm 53), a first biasing member (e.g., spring 55), and a second biasing member (e.g., spring 56). The roller (e.g., roller 54) faces a mover (e.g., mover 200). The roller holder (e.g., arm 53) holds the roller (e.g., roller 54) and is displaceable with respect to the mover (e.g., mover 200). The first biasing member (e.g., spring 55) applies a first biasing force to the roller holder (e.g., arm 53) to press the roller (e.g., roller 54) against the mover (e.g., mover 200). The second biasing member (e.g., spring 56) applies a second biasing force larger than the first biasing force to the roller holder (e.g., arm 53) to press the roller (e.g., roller 54) against the mover (e.g., mover 200).

According to a second aspect, in the first aspect of the biasing force adjusting device, the biasing force adjusting device includes a shaft (e.g., shaft 5*l* b) that supports the roller holder (e.g., arm 53) rotatably. The roller holder (e.g., arm 53) is to be rotated around the shaft (e.g., shaft 51*b*) as a fulcrum by at least one of the first biasing force or the second biasing force.

According to the first aspect and the second aspect, the biasing force adjusting device that can adjust the biasing force with a small error can be applied.

According to a third aspect, in the first aspect or the second aspect of the biasing force adjusting device, the first biasing member (e.g., spring 55) applies the first biasing force to the roller holder (e.g., arm 53) to form a contact between the mover (e.g., mover 200) and the roller (e.g., roller 54) at a first contact position. The second biasing member (e.g., spring 56) applies the second biasing force to the roller holder (e.g., arm 53) to form a contact between the mover (e.g., mover 200) and the roller (e.g., roller 54) at a second contact position different from the first contact position.

According to a fourth aspect, in the third aspect or fourth aspect of the biasing force adjusting device, a contact force between the mover (e.g., mover 200) and the roller (e.g., roller 54) at the second contact position is set to be greater than a contact force between the mover (e.g., mover 200) and the roller (e.g., roller 54) at the first contact position.

According to a fifth aspect, in any one of the first aspect to fourth aspect of the biasing force adjusting device, the roller (e.g., roller 54) is separated from the mover (e.g., mover 200) when the first biasing force and the second biasing force are not applied to the roller holder (e.g., arm 53).

According to the third aspect to fifth aspect, deviation of the biasing force with respect to the mover (e.g., mover 200) can be reduced.

According to a sixth aspect, in any one of the first aspect to fifth aspect of the biasing force adjusting device includes a movable body (e.g., slider 52) movable in a predetermined direction. The roller holder (e.g., arm 53), the first biasing member (e.g., spring 55), and the second biasing member (e.g., spring 56) are to, in conjunction with a movement of the movable body (e.g., slider 52), switch among a state in which the mover (e.g., mover 200) and the roller (e.g., roller 54) contact at a first contact position, a state in which the mover (e.g., mover 200) and the roller (e.g., roller 54) contact at a second contact position, and a state in which the roller (e.g., roller 54) is separated from the mover (e.g., mover 200).

According to a seventh aspect, in the sixth aspect of the biasing force adjusting device, the movable body (e.g., slider 52) includes a regulator (e.g., cams 57 and 58) that regulates the movement of the movable body (e.g., slider 52) in the predetermined direction.

According to an eighth aspect, in the seventh aspect of the biasing force adjusting device, the biasing force adjusting device includes a plurality of regulators (e.g., cams 57 and 58) including the regulator (e.g., cams 57 and 58). The plurality of regulators (e.g., cams 57 and 58) are coaxially (e.g., shaft 51*c*) rotatable.

According to the sixth aspect to eighth aspect, the roller holder (e.g., arm 53), the first biasing member (e.g., spring 55), and the second biasing member (e.g., spring 56) move together with the movement of the moving member (e.g., slider 52), and therefore switching among the contact state, the reinforced contact state, and the separation state of the roller (e.g., roller 54) can be accurately performed.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

Any one of the above-described operations may be performed in various other ways, for example, in an order different from the one described above.

The invention claimed is:

1. A biasing force adjusting device comprising:
a roller to face a mover;
a roller holder holding the roller and being displaceable with respect to the mover;
a first biaser having a first spring structure to apply a first biasing force to a first portion of the roller holder to press the roller against the mover;
a second biaser having a second spring structure to apply a second biasing force to a second portion of the roller holder to press the roller against the mover,
wherein a biasing force to the roller is switchable from a first state to a second state, only the first biaser is biasing the first portion of the roller holder in the first state, and
wherein the first biaser and the second biaser are arranged in parallel.

2. The biasing force adjusting device according to claim 1, further comprising:
a shaft supporting the roller holder rotatably,
wherein the roller holder is to be rotated around the shaft as a fulcrum by at least one of the first biasing force or the second biasing force.

3. The biasing force adjusting device according to claim 1,
wherein the first biaser is to apply the first biasing force to the roller holder to form a contact between the mover and the roller at a first contact position, and
wherein the second biaser is to apply the second biasing force to the roller holder to form a contact between the mover and the roller at a second contact position different from the first contact position.

4. The biasing force adjusting device according to claim 3,
wherein a contact force between the mover and the roller at the second contact position is set to be greater than a contact force between the mover and the roller at the first contact position.

5. The biasing force adjusting device according to claim 1,
wherein the roller is separated from the mover when the first biasing force and the second biasing force are not applied to the roller holder.

6. The biasing force adjusting device according to claim 1, further comprising:
a movable body movable in a predetermined direction,
wherein the roller holder, the first biaser, and the second biaser are to, in conjunction with a movement of the movable body, switch among a state in which the mover and the roller contact at a first contact position, a state in which the mover and the roller contact at a second contact position, and a state in which the roller is separated from the mover.

7. The biasing force adjusting device according to claim 6, wherein:

the movable body includes a regulator to regulate the movement of the movable body in the predetermined direction.

8. The biasing force adjusting device according to claim 7, further comprising:

a plurality of regulators including the regulator, the plurality of regulators being coaxially rotatable.

9. A transfer device comprising the biasing force adjusting device according to claim 1, wherein the mover is a transfer belt.

10. An image forming apparatus comprising the transfer device according to claim 9.

11. The biasing force adjusting device according to claim 1, wherein:

the first portion of the roller holder and the second portion of the roller holder are integrated in the roller holder.

12. The biasing force adjusting device according to claim 1, wherein:

the first biaser and the second biaser bias a same portion of the roller via the roller holder.

13. A biasing force adjusting device comprising:

a roller to face a mover;

a roller holder holding the roller and being displaceable with respect to the mover;

first means for biasing to apply a first biasing force to the roller holder to press the roller against the mover;

second means for biasing to apply a second biasing force greater than the first biasing force to the roller holder to press the roller against the mover, wherein a biasing force to the roller is switchable from a first state to a second state, only the first means for biasing is biasing the roller holder in the first state, and wherein the first means for biasing and the second means for biasing are arranged in parallel.

14. The biasing force adjusting device according to claim 13, further comprising:

a shaft supporting the roller holder rotatably, wherein the roller holder is to be rotated around the shaft as a fulcrum by at least one of the first biasing force or the second biasing force.

15. The biasing force adjusting device according to claim 13, wherein the first means for biasing is to apply the first biasing force to the roller holder to form a contact between the mover and the roller at a first contact position, and wherein the second means for biasing is to apply the second biasing force to the roller holder to form a contact between the mover and the roller at a second contact position different from the first contact position.

16. The biasing force adjusting device according to claim 15, wherein a contact force between the mover and the roller at the second contact position is set to be greater than a contact force between the mover and the roller at the first contact position.

17. The biasing force adjusting device according to claim 13, wherein the roller is separated from the mover when the first biasing force and the second biasing force are not applied to the roller holder.

18. The biasing force adjusting device according to claim 13, further comprising:

a movable body movable in a predetermined direction, wherein the roller holder, the first means for biasing, and the second means for biasing are to, in conjunction with a movement of the movable body, switch among a state in which the mover and the roller contact at a first contact position, a state in which the mover and the roller contact at a second contact position, and a state in which the roller is separated from the mover.

19. A transfer device comprising the biasing force adjusting device according to claim 13, wherein the mover is a transfer belt.

20. An image forming apparatus comprising the transfer device according to claim 19.

21. The biasing force adjusting device according to claim 1, wherein:

only the second biaser is biasing the second portion of the roller holder in the second state.

* * * * *